(12) United States Patent
Haynes

(10) Patent No.: US 7,913,975 B2
(45) Date of Patent: Mar. 29, 2011

(54) MECHANIZED CONTAINER AND HAMPER STACKER

(76) Inventor: Terry Haynes, Cleveland, MS (US)

( * ) Notice: Subject to any disclaimer, the term of this patent is extended or adjusted under 35 U.S.C. 154(b) by 1083 days.

(21) Appl. No.: 11/621,956

(22) Filed: Jan. 10, 2007

(65) Prior Publication Data

US 2008/0166215 A1 Jul. 10, 2008

(51) Int. Cl.
*B66C 23/00* (2006.01)
(52) U.S. Cl. .............. 254/2 B; 254/133 R; 254/7 B; 254/93 H
(58) Field of Classification Search ............. 254/2 B, 254/93 R, 134, 133 R, 93 H, 7 B, 7 R, 89 H, 254/8 B, 8 R; 29/242
See application file for complete search history.

(56) References Cited

U.S. PATENT DOCUMENTS

| | | | |
|---|---|---|---|
| 2,894,605 A | 7/1959 | Leavitt | |
| 3,101,851 A | 8/1963 | Heide et al. | |
| 3,770,143 A | 11/1973 | Breitbach | |
| 4,042,124 A | 8/1977 | Bowdry, III et al. | |
| 4,088,244 A | 5/1978 | Fisher | |
| 4,865,515 A | 9/1989 | Dorner et al. | |
| 5,695,173 A * | 12/1997 | Ochoa et al. | 254/122 |
| 5,911,408 A * | 6/1999 | Berends et al. | 254/2 B |
| 6,116,577 A * | 9/2000 | McCanse | 254/2 B |
| 6,409,153 B1 * | 6/2002 | Norris | 254/93 R |
| 6,505,815 B1 * | 1/2003 | Dellamore | 254/2 B |
| 6,769,668 B2 | 8/2004 | Siglock | |
| 7,347,409 B2 * | 3/2008 | Goza | 254/2 B |
| 2003/0178259 A1 * | 9/2003 | Henderson | 187/275 |
| 2008/0166215 A1 * | 7/2008 | Haynes | 414/788.2 |
| 2008/0230321 A1 * | 9/2008 | Csaszar et al. | 187/244 |

FOREIGN PATENT DOCUMENTS

| | | |
|---|---|---|
| EP | 0.182.727 | 5/1986 |
| EP | 0.296.601 | 12/1988 |
| GB | 2.353.776 | 3/2001 |
| JP | 11292489 | 10/1999 |

* cited by examiner

*Primary Examiner* — Lee D Wilson
(74) *Attorney, Agent, or Firm* — Michael I. Kroll

(57) ABSTRACT

A stacker unit having an inlet area with sensors to detect ingress of a hamper or similar nestable container whereby a plurality of parallel lifting elements complimentary of the container, may grasp the container and lift it to perform a stacking operation when combined with a plurality of stacked containers. The inlet area has a plurality of walls providing structure and mounting for sensors and controls for selecting containers having an open end forming an entrance, within the entrance a plurality of guides, lifting elements and adaptors are actuated upon detection of an incoming container operable in lifting the container for stacking by utilization of a chain drive and motor having adjustable plates coupled to the lifting elements. It is also capable of lateral adjustment to suit differently sized containers utilizing attachments for the lifting of hampers, wire containers and 084C containers along with having a plurality of lockout controls for better control and safety precautions while operating a lifting and stacking procedure.

16 Claims, 13 Drawing Sheets

MECHANIZED CONTAINER AND HAMPER STACKER

BACKGROUND OF THE INVENTION

1. Field of the Invention

The present invention relates generally to lifting and stacking and, more specifically, to a mechanical device forming a station having an inlet area with sensors to detect ingress of a hamper or similar nestable container whereby a plurality of parallel lifting elements complimentary of the said container, may grasp the container and lift it to perform a stacking operation when combined with a plurality of stacked containers.

Forming the present invention is a plurality of walls providing structure and mounting for sensors and controls for selecting containers having an open end forming an entrance, within said entrance a plurality of guides, lifting elements and adaptors are actuated upon detection of an incoming container operable in lifting said container for stacking by utilization of a chain drive and motor having adjustable plates coupled to said lifting elements.

Additionally the present invention is capable of lateral adjustment to suit differently sized containers utilizing attachments for the lifting of hampers, wire containers and 084C containers along with having a plurality of lockout controls for better control and safety precautions while operating a lifting and stacking procedure.

2. Description of the Prior Art

There are other stacking devices designed for lifting and stacking containers. Typical of these is U.S. Pat. No. 2,894,605 issued to Leavitt on Jul. 14, 1959.

Another patent was issued to Heide et al on Aug. 27, 1963 as U.S. Pat. No. 3,101,851. Yet another U.S. Pat. No. 3,770,143 was issued to Breitbach on Nov. 6, 1973 and still yet another was issued on Aug. 16, 1977 to Bowbry et al as U.S. Pat. No. 4,042,124.

Another patent was issued to Fisher on May 9, 1978 as U.S. Pat. No. 4,088,244. Yet another U.S. Pat. No. 4,865,515 was issued to Dorner et al on Sep. 12, 1989. Another was issued to Siglock on Aug. 3, 2004 as U.S. Pat. No. 6,769,668 and still yet another was issued on Nov. 15, 1985 to Lefort as European Patent No. EP0182727.

Another patent was issued to Dorner on Jun. 23, 1988 as European Patent No. EP0296601 Yet another U.K. Patent No. GB2353776 was issued to Oakes on Aug. 24, 1999. Another was issued to Nagao on Oct. 26, 1999 as Japanese Patent No. JP 11292489.

A fork lift truck comprising a frame, said frame including horizontal base having supporting wheels and further including a pair of spaced, parallel channel bars having front and rear flanges defining outwardly facing channels, said bars being attached to and extending upwardly from said base and four crossmembers, including a top crossmemeber, a second cross member disposed below and adjacent said top cross member. A third cross member below said second cross member and a fourth crossmember below said third crossmember and above said base.

In a pan conveying system for stackable baking pans a continuously moving main conveyor operative to carry forwardly a consecutive series of stackable pans to and beyond a pan control station, first automatic means at the rearward end of said control station positioned in cooperating partially-overlying relation to said main conveyer and operative to sense pans as they are delivered thereto in consecutive series and effect their successive lateral removal from said main conveyor and onto an elevator lift platform, said platform being responsive to lateral pan delivery thereto to move downward one pan height thereby to enable stacking of a pan stack of predetermined height thereon, said means including a discharge conveyer disposed at least one full stack length below said main conveyer and operative to transfer full pan stacks from said elevator lift platform as formed for removal and storage preparatory to re-use, second automatic means positioned forwardly of said first means at the forward end of said control station in cooperating partially-overlying relation to said main conveyer and operative to unstuck pans from full stacks and effect their successive lateral delivery onto said main conveyer forwardly of said first means from an elevator lift platform, said platform being responsive to lateral pan removal therefrom to move upward on pan height thereby to enable unstacking of a pan stack supported thereon, said second means including an inlet conveyer disposed a least one full stack height below said main conveyer and operative to transfer full pan stacks thereto, and sequence control means forwardly of said second means operative to sense the pan supply on said main conveyer forwardly of said pan supply on said main conveyer forwardly of said pan control station and effect selected initiation and interruption of operations on said first and second means to maintain desired rate of delivery of pans of a predetermined type by said main conveyer forwardly of said pan control station.

An apparatus for transferring baking trays and the like of ferromagnetic material between a tray conveyor system and a stack wherein an elevated tray conveyer system supports and advances articles laterally of a stack elevator which is operative to position the stack with the top tray at a level adjacent the tray conveyor, an endless type magnetic overhead conveyor overlies the elevator and tray conveyor, and a tray transfer mechanism is provided for transferring trays between the overhead conveyor and tray transfer mechanism is provided for transferring trays between the overhead conveyor and stack. The apparatus can be arranged to effect either a tray stacking or tray unstacking operation In a pan unstacking and stacking system, stacks of pans are vertically positioned by pairs of spaced, parallel lift chains and pan engaging members mounted thereon. The lift chains are driven by drive shafts and drive sprockets which engage the upper and lower courses of a drive chain, respectively, thereby permitting adjustment of the spacing between the pan engaging members to accommodate pans of various sizes. The drive chain is in turn driven by a fluid powered cylinder operating through a clutch and brake apparatus to control the vertical positioning of the pan engaging members and pan stacks mounted thereon. Pans are transferred laterally relative to pan stacks supported on the pan engaging members by means of magnets positioned along a line in a horizontal plane situated above a stack and V-belts mounted for rotation around parallel courses situated on opposite sides of the line of magnets and including horizontal portions extending coincident therewith. To effect unstacking, magnets are lowered to engage the uppermost pan from a stack and then are raised to engage the pan with the belts, whereby the pan is transferred laterally. To effect stacking, the belts position a pan above the pan engaging members, after which the pan is pushed downwardly out of the field of the magnets and is dropped onto the stack.

Apparatus for separating, or de-nesting, the lowermost flanged container from a nested stack of flanged containers is characterized by a flange support member reciprocally movable from a first to a second rectilinear position. The flange support member has first and second flange support surfaces thereon, the second flange support surface being rectilinearly behind and in a vertical plane above the first flange support surface. In the first position, the first flange support surface supports the flanges of the lowermost container above an opening provided in a baseplate. As the flange support member rectilinearly displaces to the second position, a lifting surface lifts the flanges of the next-lowermost container onto the second flange support surface cotemporaneously with the withdrawal of the first flange support surface out of its supporting relationship with the flanges of the lowermost container. Thus, the flanges of the next-lowermost container are supported on the second flange support surface above the opening in the baseplate as the lowermost container passes therethrough.

An apparatus for unstacking and stacking containers. The apparatus includes a frame defining a compartment to receive a stack of containers, and a guide mechanism mounted within the frame to guide the stack in vertical movement. Located beneath the compartment is a conveyor, which in the unstacking mode, will deliver a stack of containers to the compartment and discharge individual containers. A vertically movable lift mechanism is mounted in the frame and includes a plurality of pivotable lift members disposed to engage a rim on the second lowermost container, to elevate the stack, and a plurality of holding members mounted on the frame and disposed to engage the upper surface of the rim on the lowermost container to hold the lowermost container against elevation. After elevation of the stack, the separated lowermost container is in a ready position to be conveyed away on the conveyor, depending on a need in the conveying system. In the stacking mode of operation, individual containers are moved on the conveyor to a position beneath the compartment and each container is elevated in the compartment by the lift members and held in the elevated position by the holding members. A second container is then moved into the compartment and elevated into contact with the first container, moving the first container upwardly to form a stack, and the stack is held by the holding members. After completion of the stack, the stack can be lowered onto the conveyor and conveyed to a discharge site.

A jack for lifting an object includes a base assembly and a jacking assembly. The base assembly has a frame with a base member having a nesting chamber, lifting arms pivotally connected to the base member, and a support member for supporting the object. The support member is pivotally connected to the lifting arms and is disposed parallel to the base member. The support member and the lifting arms pivot with respect to the base member into positions including a fully raised position wherein the support member is lifted away from the base member and a fully lowered position wherein the support members and the lifting arms are at least partly nested within the nesting chamber. The jacking assembly is connected to the base assembly for moving the support members and the lifting arms from the fully lowered position towards the fully raised position.

A lifting device comprising a welded chassis 1 on which is fixed in an articulated manner at its lower part a single vertical tubular post 3 along which moves a movable carriage 16 supporting an elevator drawn by a cable actuated by a manual or electric winch. The length of the post may be increased by inserting nestable elements into one another. The winch is fixed onto a winch support 12 which is connected to the chassis and which locks the post in a vertical position. For transporting and handling the device, the post folds in a horizontal position over the chassis and receives the winch support. For assembly, the winch support is unfolded into a vertical position and locked by means of the two struts 14, then the winch by pulling on the cable directs the post into a vertical position; it remains only to install the pins 6 and 9 for locking the post. The movable carriage may be equipped with a safety brake which locks the carriage and its assembly to the post in the event of the cable breaking.

An apparatus for unstacking and stacking containers (1). A frame (16) defines a compartment (18) to receive a stack (4) of containers (1) delivered by a conveyor (5), a guide mechanism (27, 28) and a vertically movable lift mechanism (33) including lift members (56) to engage a rim (2) on the second lowermost container, to elevate the stack (4), and holding members (63, 64) to engage the upper surface of the rim (2) on the lowermost container to hold the lowermost container against elevation. After elevation of the stack (4), the separated lowermost container is in a ready position to be conveyed away on the conveyor (7). In the stacking mode of operation, each container (1) is elevated by the lift members (56) and held in by the holding members (63, 64). A second container (1) is then elevated, moving the first container upwardly to form a stack (4). After completion of the stack (4), the stack (4) can be lowered onto the conveyor (5, 7) and conveyed to a discharge site.

Apparatus for stacking or destacking containers comprises a stacking or destacking assembly 1, means 21 for positioning a stack of at least one container 23 within said stacking or destacking assembly, the assembly including means 14, 15 for raising the stack 17 such that the base of the lowermost container of the stack 17 is at a height greater than the height of the container, means 14, 15, 19 for locating a container directly below the raised stack, and means 14, 15 for adding said located container to the bottom of the stack or for removing said located container from below said stack. As shown, apparatus for destacking nested open-topped containers comprises permanent guide platform members 14, retractable lift platform members 15 and stack engaging arms 19. Means 21 for delivering a stack may be a wheeled support platform or dolly, and means for removing a destacked container may comprise a conveyor (13) with an end portion retractable from beneath the apparatus to allow entry of the dolly.

PROBLEM TO BE SOLVED: To stack up containers longitudinally with a forklift used for transporting open containers loaded with steel pipes, marine containers and the like. SOLUTION: A forklift is composed of frames 2 to be inserted into longitudinal lower pockets B of a container A, front wheels 3 provided in the front side of the frames 2, rear wheels 4 provided in the rear side of the frames 2, forks 5 provided so that they can be elevated with respect to the frames 2 between the front 3 and rear 4 wheels and lift up the container A, an elevating device 6 provided in the rear side of the frames 2 to elevate the forks 5, and a supporting device 7 provided in the front side of the frames 2 to support the end of the forks 5, and it is to specially lift up the container A from the longitudinal direction.

While these stacking devices may be suitable for the purposes for which they were designed, they would not be as suitable for the purposes of the present invention, as hereinafter described.

SUMMARY OF THE PRESENT INVENTION

A primary object of the present invention is to provide a lifting and stacking device having components and structure capable of lifting and stacking a plurality of different large nestable containers in an efficient and safe manner.

Another object of the present invention is to provide a lifting and stacking device having capability of stacking hampers, 084C containers and wire containers effectively.

Yet another object of the present invention is to provide a lifting and stacking device having capability of adjustment to lift differently sized containers through adjustment of associated lifting attachments.

Still yet another object of the present invention is to provide a lifting and stacking device having a rear portion having sensors to detect the ingress of a container and provide motors and chain drives to provide force for lifting and lowering containers to a pre-selected height, Another object of the present invention is to provide a lifting and stacking device having a plurality of controls and lockout devices for adjustment and safety of operation.

Yet another object of the present invention is to provide a lifting and stacking device having a plurality of attachments and adaptors that may be coupled to the device to accommodate for a broader range of containers that may be lifted.

Still yet another object of the present invention is to provide a lifting and stacking device having guides to facilitate for the proper placement of containers before initiating a lifting operation.

Additional objects of the present invention will appear as the description proceeds.

The present invention overcomes the shortcomings of the prior art by providing a lifting and stacking device having capability of performing a stacking operation on hampers, 084C containers and wire containers along with many others utilizing guides, container specific attachments, a driving force, sensors and lockout devices for the safe and efficient stacking of a plurality of different containers. Additionally the present invention allows for adjustment of differently sized containers and automation controls for quick operation of stacking procedures while allowing the user to correctly place containers with utilization of guide and sensor actuators.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
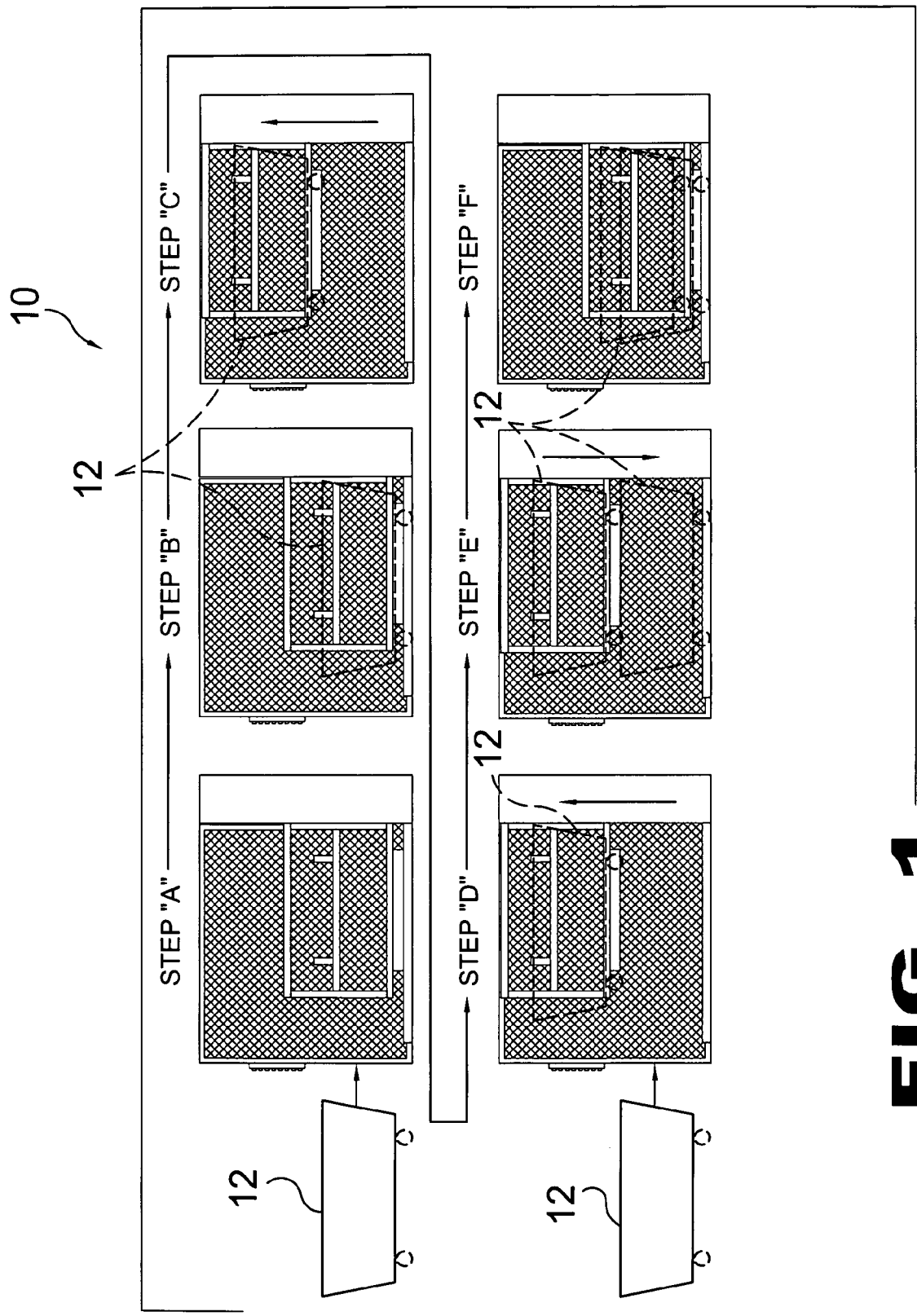
FIG. 1 is a side view of the operations performed during a stacking procedure of the present invention.

Turning now descriptively to the drawings, in which similar reference characters denote similar elements throughout the several views, the figures illustrate the Apparatus for Stacking and Unstacking Nestable Containers of the present invention. With regard to the reference numerals used, the following numbering is used throughout the various drawing figures.

10 Apparatus for Stacking and Unstacking Nestable Containers of the present invention
12 container
14 base frame
18 safety guard
20 container guide
22 control panel
24 sensors
26 vertical cylinder
28 pump and screw motor
30 chain drive
32 cloth hamper lift arms
34 plastic hamper lift adapter
36 wire container lift arm
38 casters
40 floor locks
42 vertical plate
44 container guide
46 blue ready light
48 hamper selector switch
50 up switch
52 down switch
54 in switch
56 out switch
58 power on light
60 lock-out device
62 support bushing assembly
64 limit switch

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a side view of the operations performed during a stacking procedure of the present invention 10. Shown is the progression of the present invention 10 performing a stacking operation whereby first a container 12 is loaded into position and lifted to receive a second container 12 in the first container's 12 original position and the lifted container 12 is lowered back down to nest into the second hamper 12.

Figure 2:
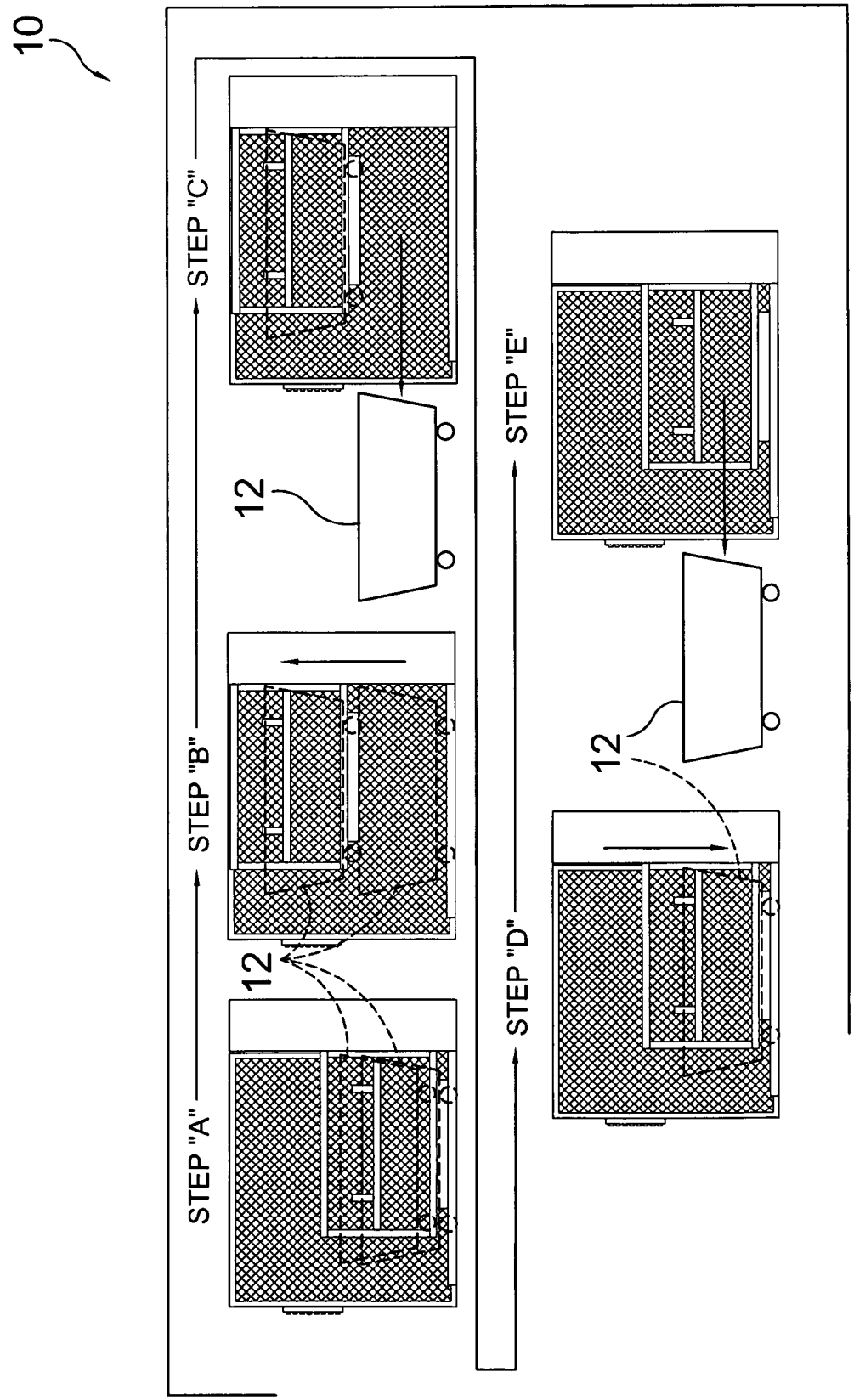
FIG. 2 is a side view of the operations performed during an unstacking procedure of the present invention.

FIG. 2 is a side view of the operations performed during an unstacking procedure of the present invention 10. Shown is the progression of the present invention performing an unstacking operation whereby the top or second to bottom container 12 is grasped and lifted to remove the bottom containers 12 one by one until the top container 12 is set down to be removed.

Figure 3:
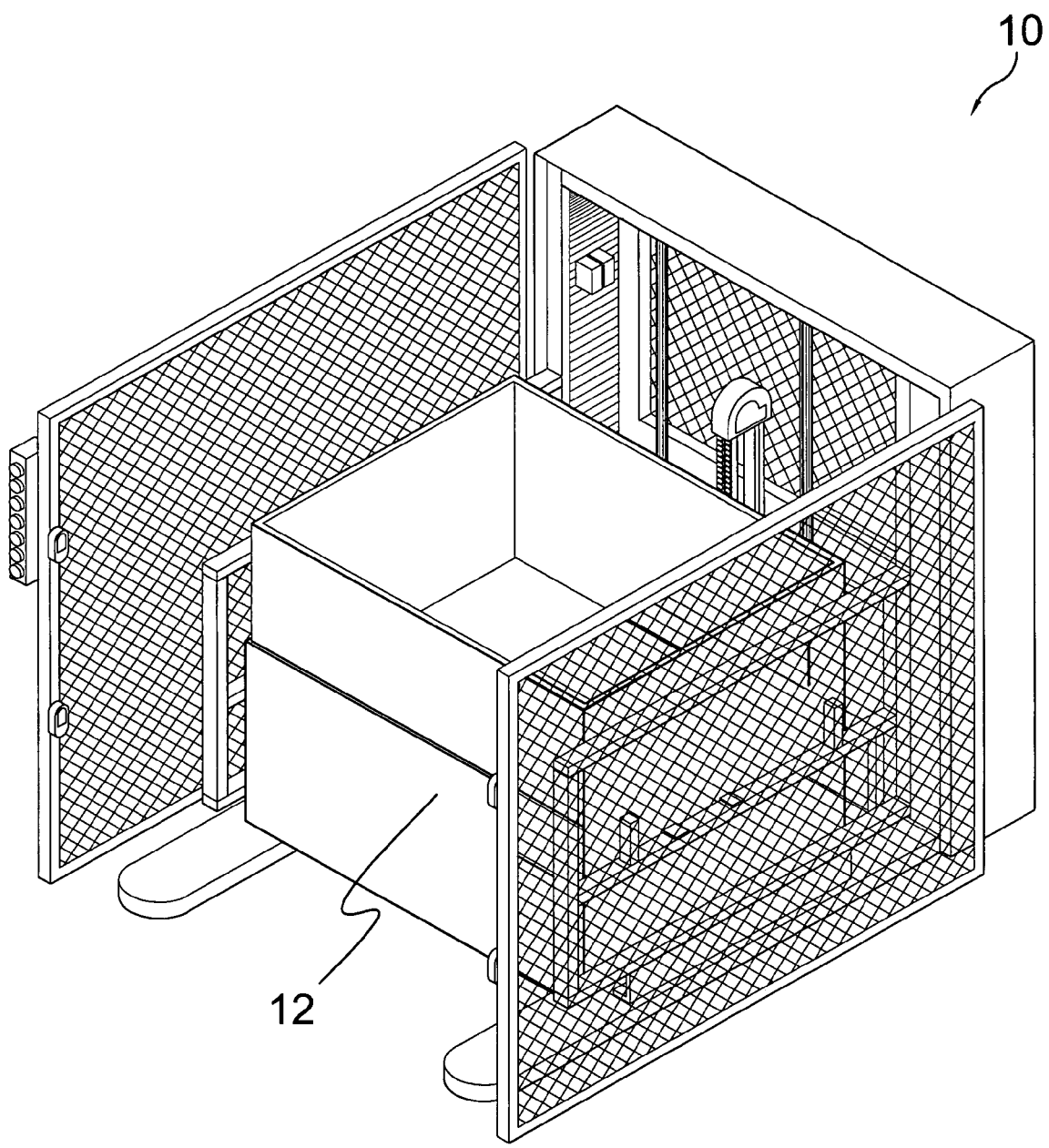
FIG. 3 is an illustrative view of the present invention.

FIG. 3 is an illustrative view of the present invention 10. The present invention 10 is an apparatus that stacks nestable containers 12 empty plastic hampers, canvas hampers, 084c containers and wire containers. Each container 12 is raised to a given height, a second container 12 is placed under the first and the first container 12 lowered into the second container 12. This procedure is followed until desired stacking height is attained. The apparatus 10 operates on 220'240 volts AC power and has a maximum lift capacity of 1200 lbs.

Figure 4:
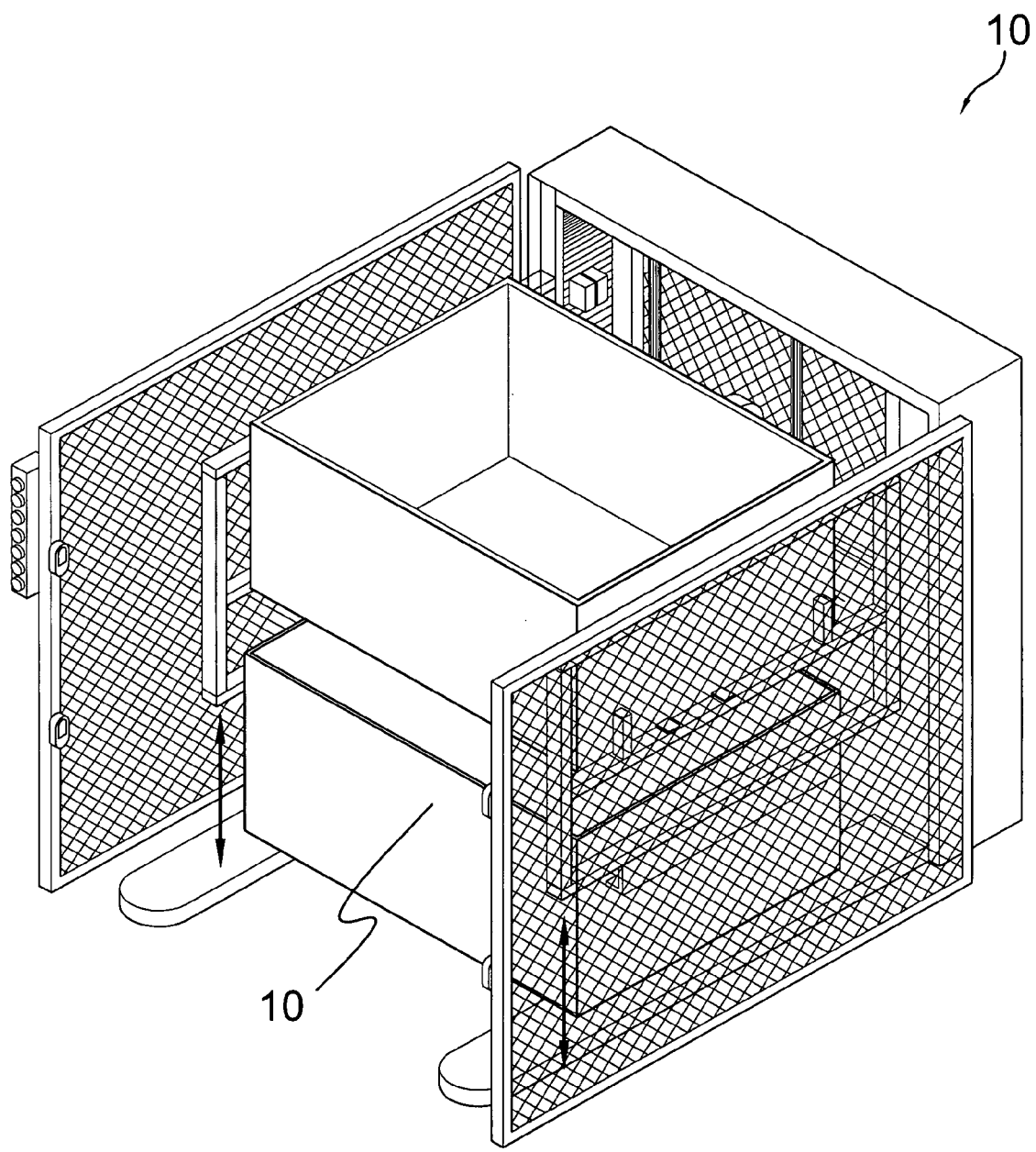
FIG. 4 is an illustrative view of the present invention in use.

FIG. 4 is an illustrative view of the present invention 10 in use. The present invention 10 is an apparatus that stacks empty plastic hampers, canvas hampers, 084c containers and wire containers. Each container 12 is raised to a given height, a second container 12 is placed under the first and the first container 12 lowered into the second container 12. This procedure is followed until desired stacking height is attained. The apparatus operates on 220'240 volts ac power and has a maximum lift capacity of 1200 lbs.

Figure 5:
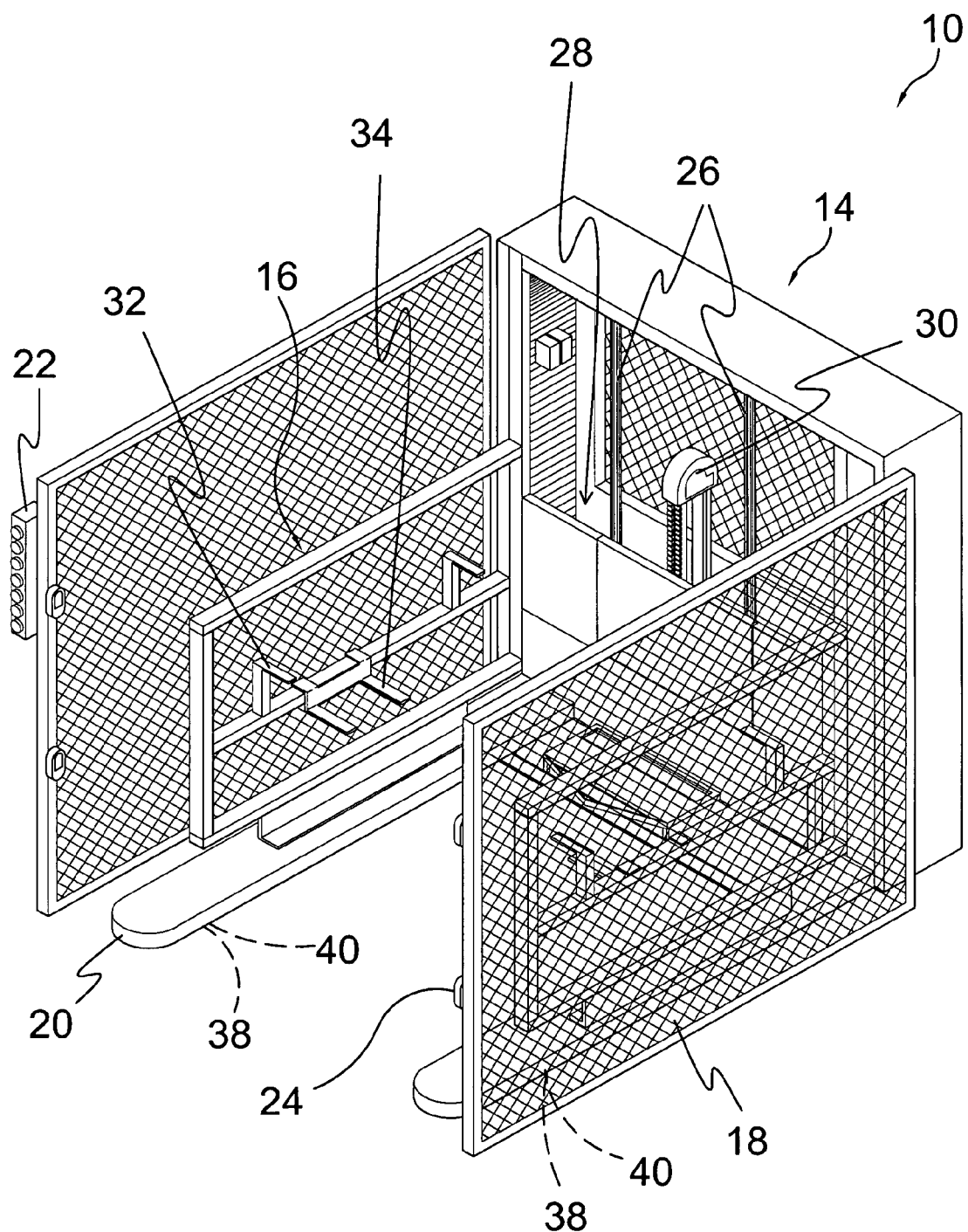
FIG. 5 is a perspective view of the present invention.

FIG. 5 is a perspective view of the present invention 10. The present invention 10 comprises a lift assembly 16 mounted on a base frame 14. The base frame includes three walls forming a safety guard 18 with elongate feet extending along the sidewalls thereof. The feet serve as entrance guides 20 to align the containers as they are wheeled therein. A control panel 22 and sensors 24 are disposed on the front portions of the side safety guards 18. A pair of spaced apart vertical cylinders 26 maintain alignment of the lift assembly 16 during operation. Movement of the lift assembly 16 is controlled by motor 28 and a chain drive 30. The lift assembly 16 includes cloth hamper 32 lift arms, plastic hamper lift adapters 34 and a wire container stacker/unstacker 36. The apparatus is mounted on fixed and swivel casters 38 for movement to other locations. The safety guards 18 are attached to the unit base 14. The unit must be locked in place with the floor locks 40 prior to operation.

Figure 6:
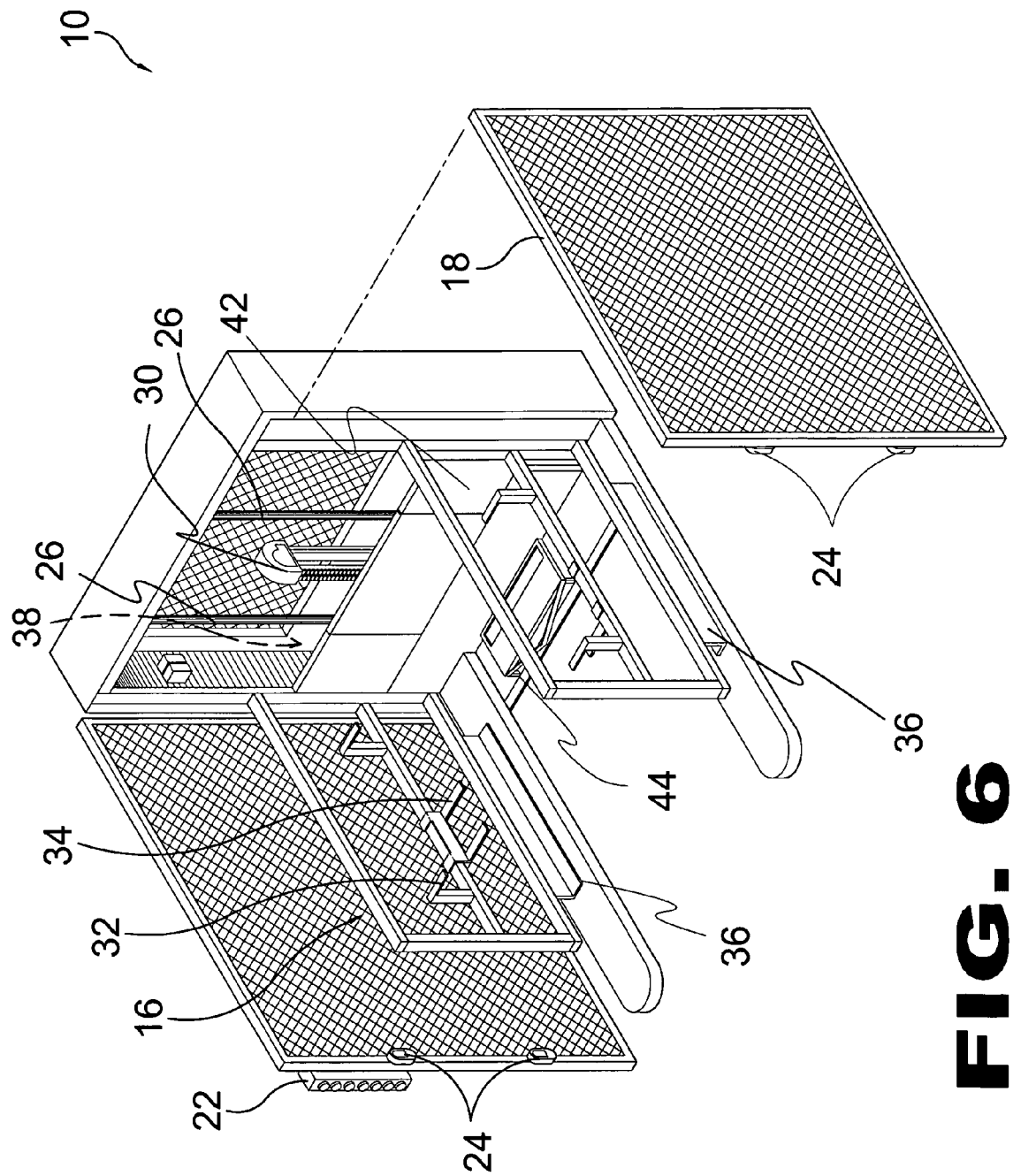
FIG. 6 is a perspective view of the present invention.

FIG. 6 is a perspective view of the present invention 10. The present invention 10 comprises a lift assembly 16 mounted on a base frame 14. The base frame includes three walls forming a safety guard 18 with elongate feet extending along the sidewalls thereof and a container guide 44 positioned in a rear portion therebetween. The feet serve as entrance guides 20 to align the containers as they are wheeled therein. A control panel 22 and sensors 24 are disposed on the front portions of the side safety guards 18. A pair of spaced apart vertical cylinders 26 maintain alignment of the lift assembly 16 during operation. Movement of the lift assembly 16 is controlled by a screw drive motor 28 and a chain drive 30 affixed to a vertical plate 42 on the lift assembly 16. The lift assembly 16 includes cloth hamper 32 lift arms, plastic hamper lift adapters 34 and a wire container stacker/unstacker 36. The device operates on 220'240 volts ac power and has a maximum lift capacity of 1200 lbs.

Figure 7:
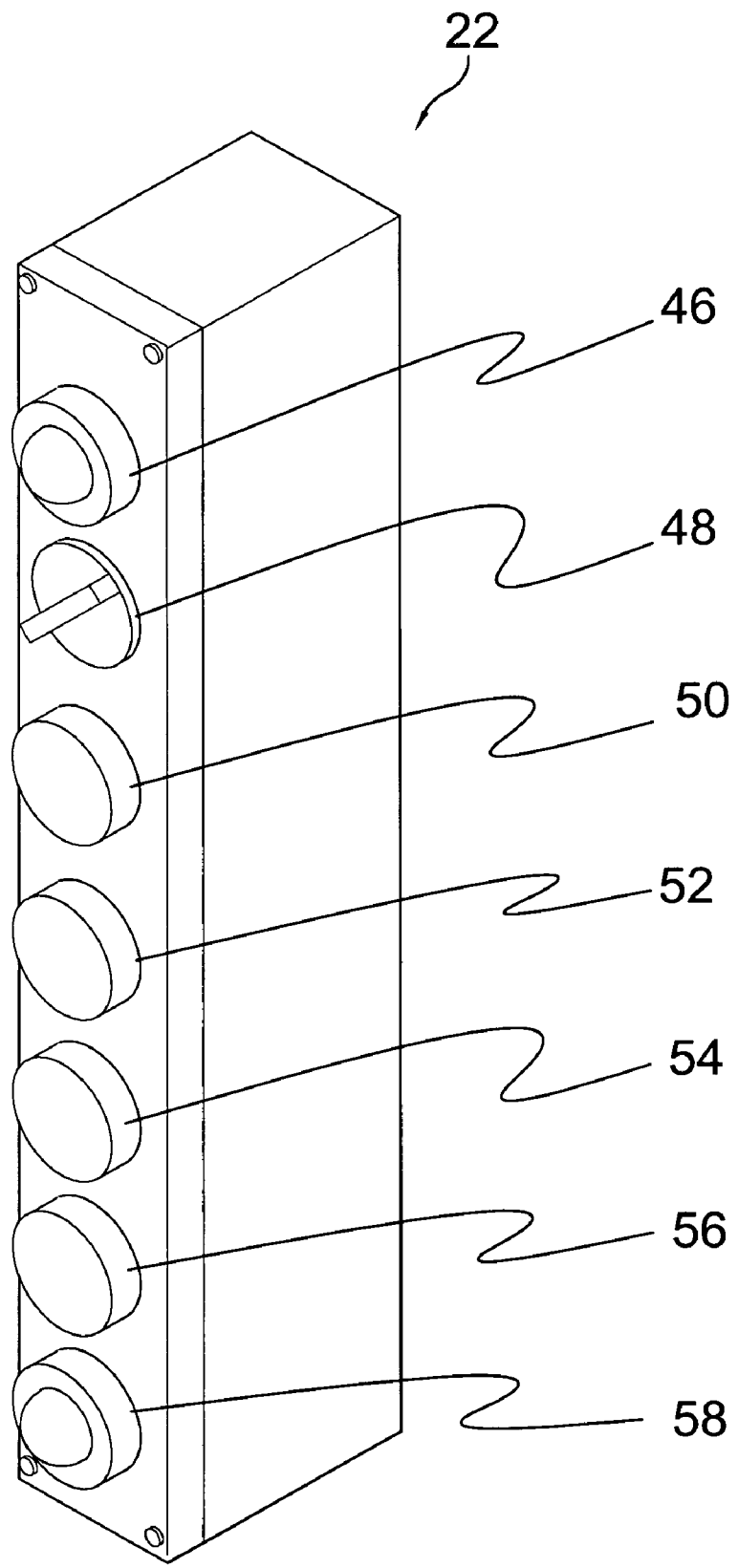
FIG. 7 is a perspective view of the control station of the present invention.

FIG. 7 is a perspective view of the control panel 22 to operate the stacker/unstacker. The control panel 22 shown has a blue ready light 46, a hamper selector switch 48, an up switch 50, a down switch 52, an in switch 54, an out switch 56 and a power on light 58. The control panel 22 assembly is mounted on the left side front of the safety guard.

Figure 8:
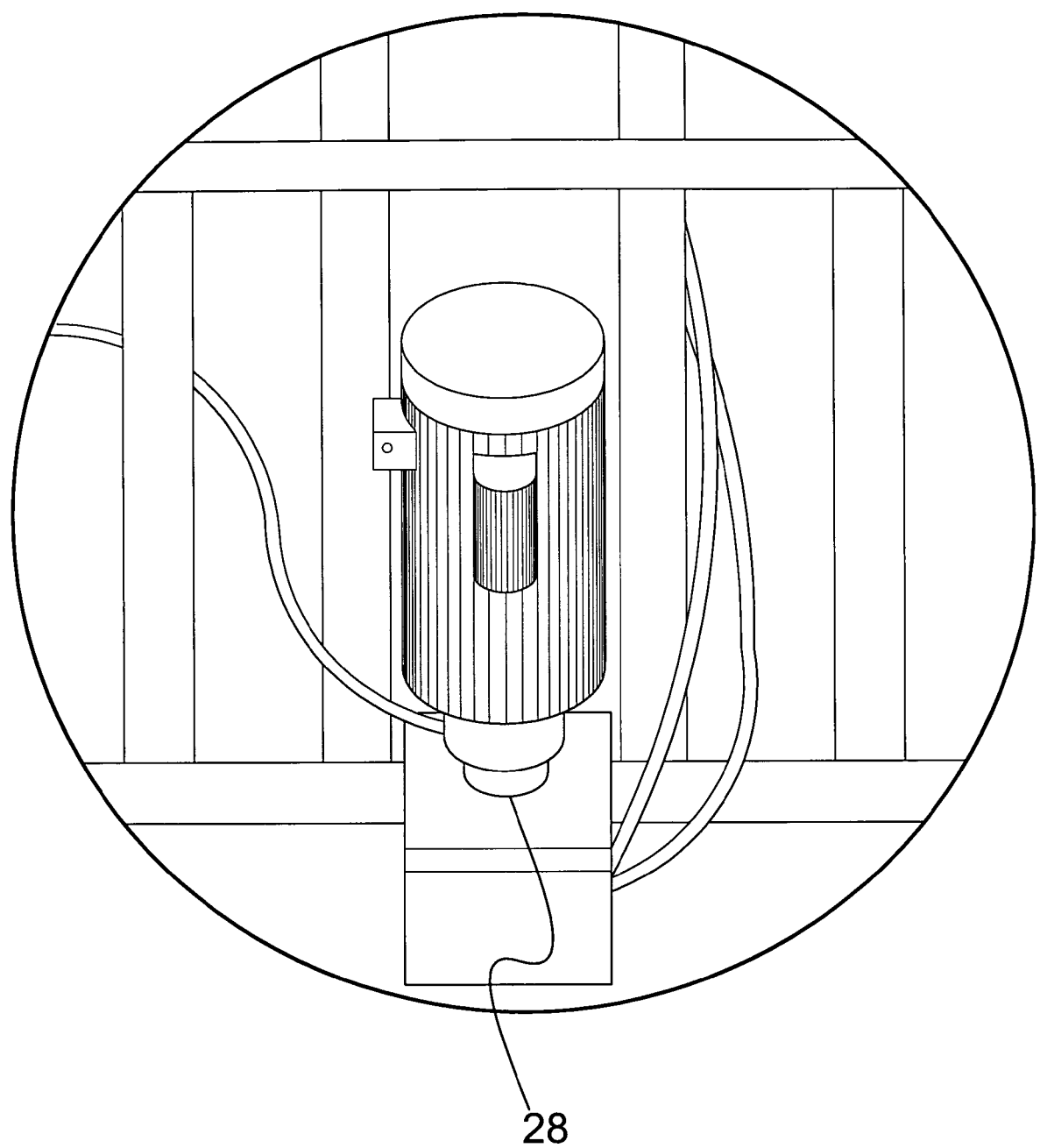
FIG. 8 is a perspective view of the pump and motor of the present invention.

FIG. 8 is a perspective view of the pump and motor 28. The pump is connected to a 3 hp motor that pulls the plates that the arms are attached too. The plates are attached to bearings that slide up and down on the vertical shafts.

Figure 9:
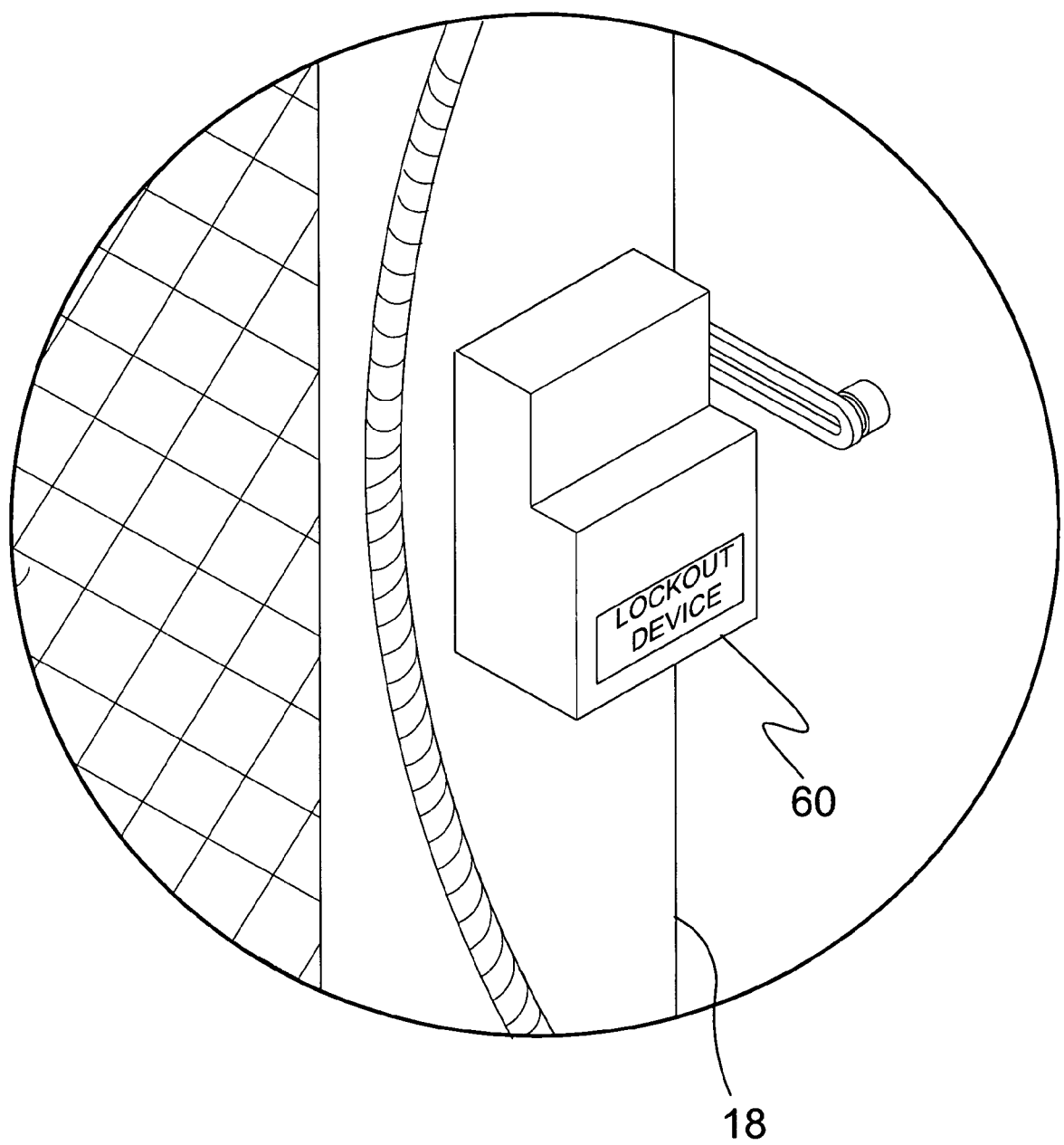
FIG. 9 is a perspective view of the lock out device of the present invention.

FIG. 9 is a perspective view of the lock out device 60 of the present invention. Shown is the lock out device 60 of the present invention. The off position will disconnect all electrical power to the unit. The lock out device 60 is located at the rear of the right safety guard 18.

Figure 10:
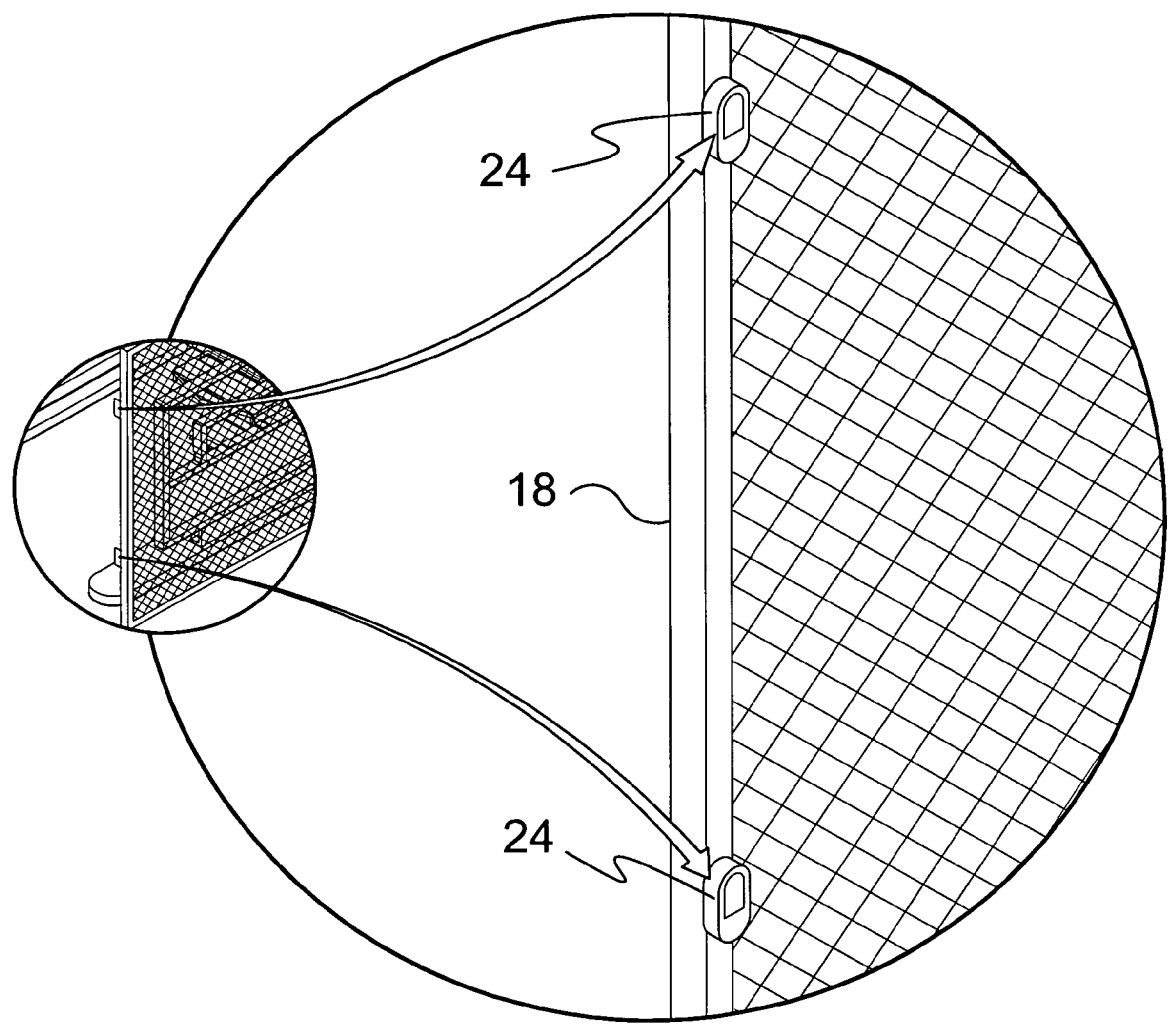
FIG. 10 is a perspective view of the photo sensors of the present invention.

FIG. 10 is a perspective view of the photo sensors 24 of the present invention. Shown are the photo sensors 24 of the present invention. The photo sensors 24 are interiorly mounted at the front of the safety guard 18. When the stacker/unstacker is in operation, the unit will stop when the beam is broken by solid objects.

Figure 11:
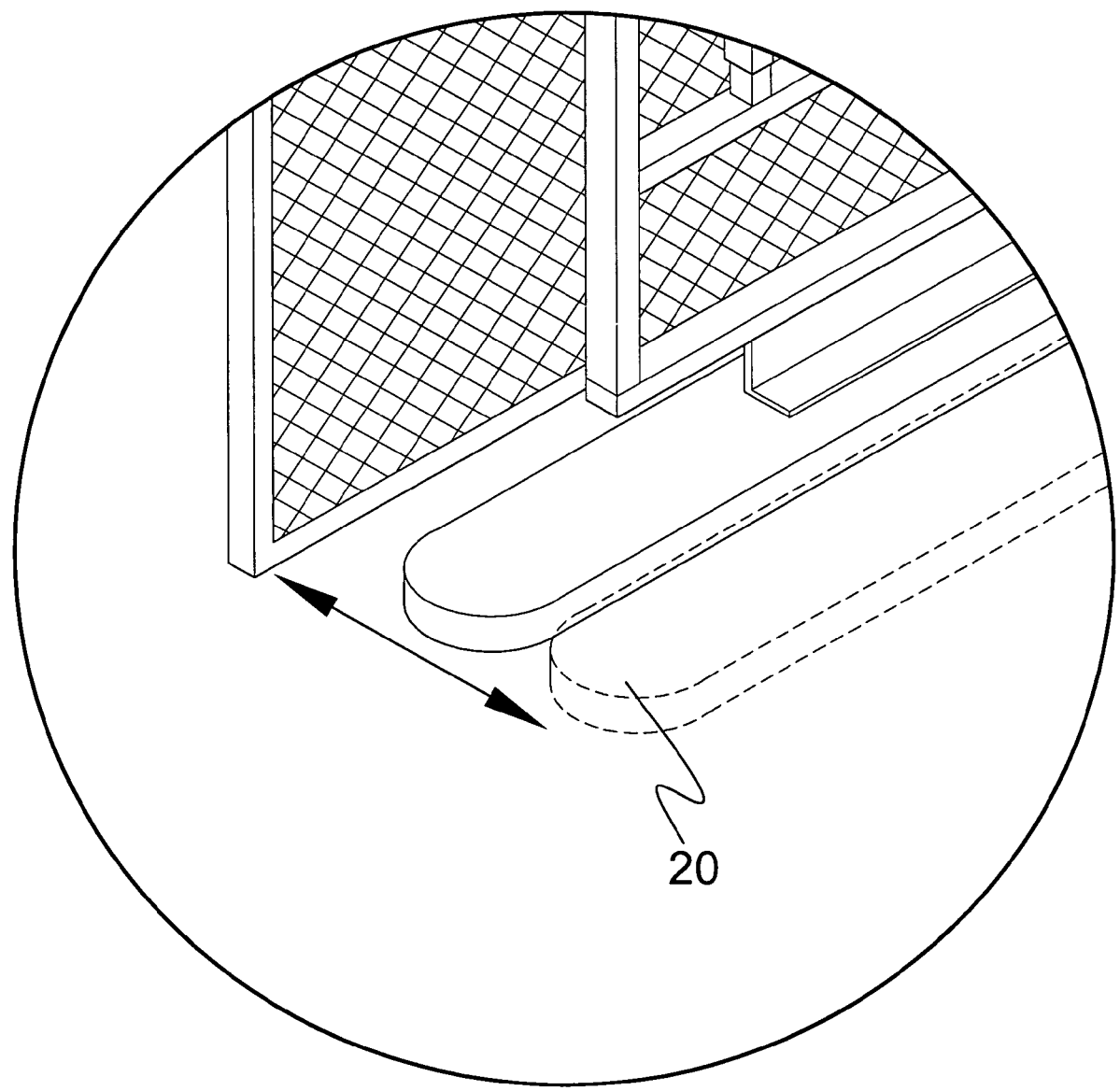
FIG. 11 is a detailed view of the present invention.

FIG. 11 is a detailed view of a container guide 20 of the present invention. Shown is a detailed view of a container guide 20 that can be moved laterally to accommodate empty plastic hampers, canvas hampers, 084c containers and wire containers. Each container is raised to a given height, a second container is placed under the first and the first container lowered into the second container. This procedure is followed until desired stacking height is attained. The device operates on 220'240 volts ac power and has a maximum lift capacity of 1200 lbs.

Figure 12:
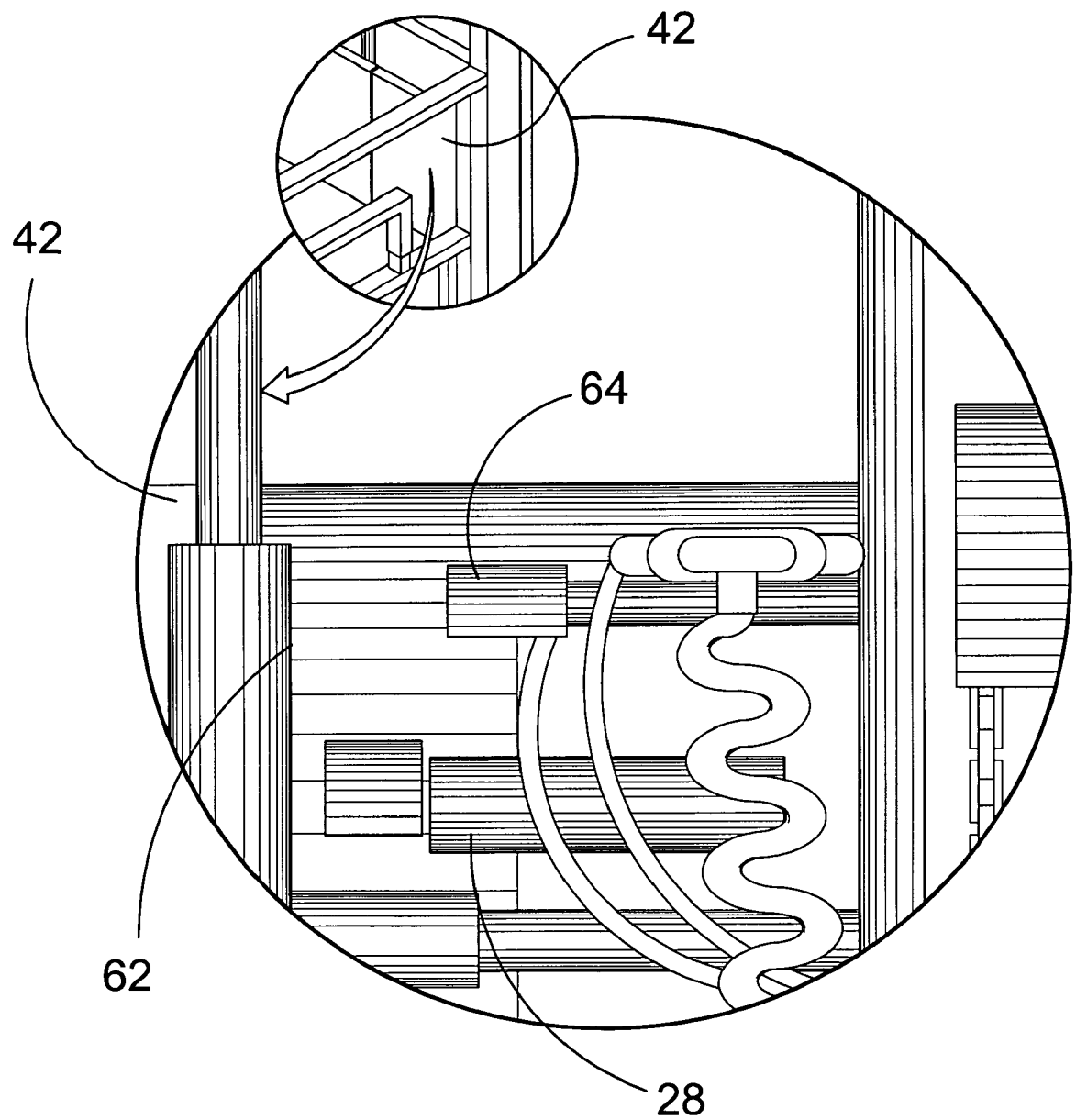
FIG. 12 is a detailed view of the present invention.

FIG. 12 is a detailed view of the motor 28. The screw drive motor 28 is attached to the plate 42 as shown, it is horizontally mounted on the plate 42 and pushes both plates 42 out and pulls both plates 42 in to grab containers for stacking. Also shown is the support bushing assembly 62 and limit switch 64.

Figure 13:
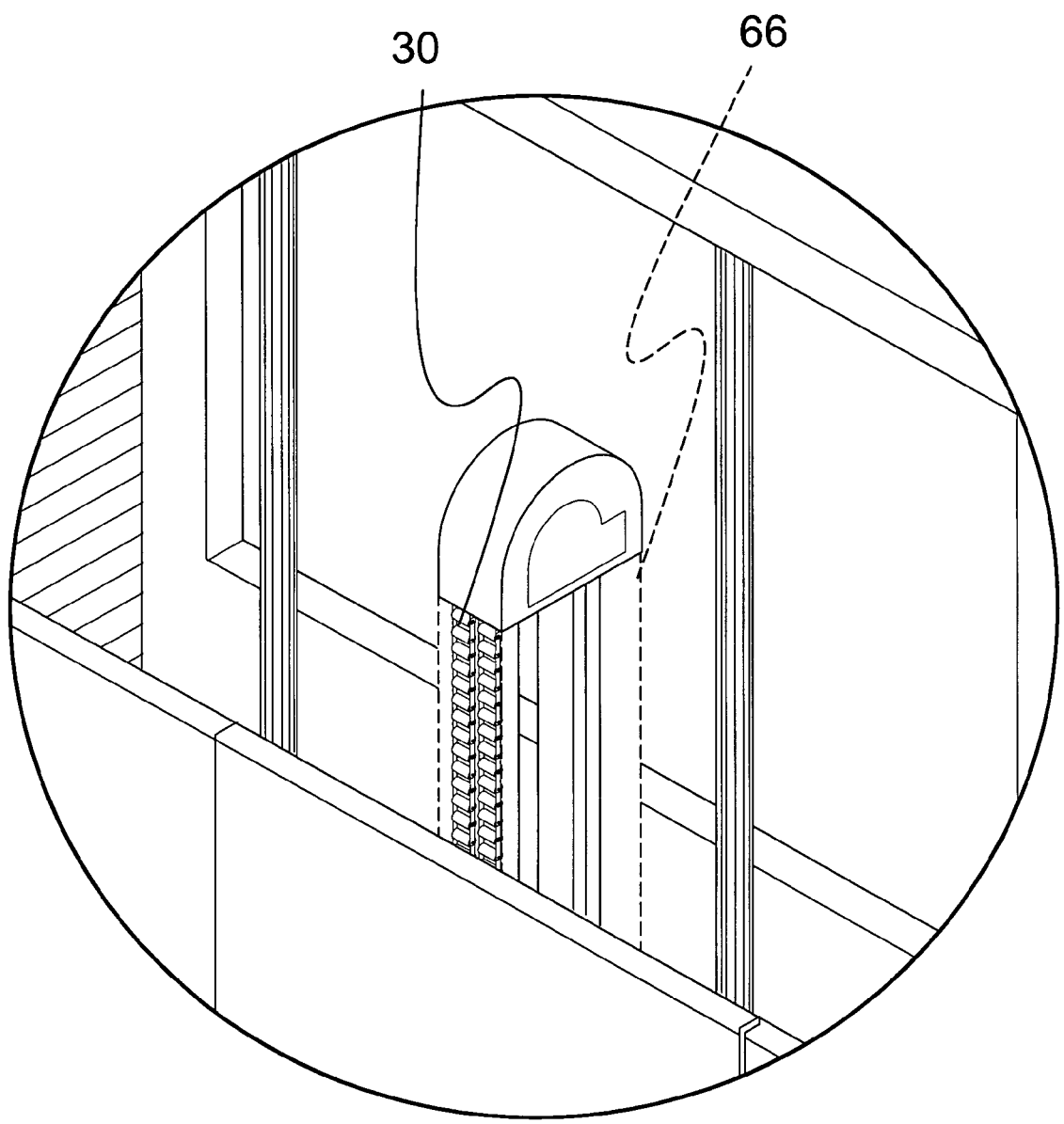
FIG. 13 is a detailed view of the present invention.

FIG. 13 is a detailed view of the chain drive 30 and its cover 66. Shown is a detailed view of the present invention, a device that stacks empty plastic hampers, canvas hampers, 084c containers and wire containers. Each container is raised to a given height, a second container is placed under the first and the first container lowered into the second container. This procedure is followed until desired stacking height is attained. The device operates on 220'240 volts ac power and has a maximum lift capacity of 1200 lbs.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. An apparatus for stacking and unstacking nestable containers comprising:
   a lifting assembly having a plurality of lifting elements for grasping different types of nestable containers;
   a base frame onto which said lifting assembly is mounted; and
   drive means for raising and lowering said lifting assembly in a controlled manner mounted on said base frame;
   said base frame comprise:

a) a rear safety guard and a pair of side safety guards forming three walls with an open end;
b) a heavy-duty support frame integral with said rear safety guard;
c) a pair of spaced apart elongate feet forming container guides extending from said support frame of said rear safety guard, parallel with and adjacent to said side safety guards, said container guides capable of lateral adjustment to accommodate various sized containers; and
d) a pair of vertical cylinders secured to said support frame;

said support frame further includes a pump and screw drive motor;

said lifting assembly includes an opposing lift arms designed to lift and lower cloth hampers, said lifting apparatus further includes a pair of opposing lift adapters for lifting and lowering plastic hampers;

said lifting assembly further includes a pair of opposing lift arms for lifting and lowering BMC and 084C containers; and said lifting assembly further includes vertical plates in communication with a chain drive.

2. The apparatus for stacking and unstacking nestable containers recited in claim 1, wherein said motor is reversible and drives said chain drive to raise and lower said lifting assembly accordingly.

3. The apparatus for stacking and unstacking nestable containers recited in claim 2, wherein said vertical plate is arranged to travel up and down said vertical cylinders to maintain proper alignment and placement during operation thereof.

4. The apparatus for stacking and unstacking nestable containers recited in claim 3, wherein said screw drive motor is horizontally mounted and configured to draw said lift elements together and move them apart accordingly for grasping said containers during the stacking and unstacking procedures.

5. The apparatus for stacking and unstacking nestable containers recited in claim 4, further including at least one photo sensor interiorly mounted on the front of a side safety guard that will cease operation when a solid object is detected in the entryway thereof.

6. The apparatus for stacking and unstacking nestable containers recited in claim 5, further including a manual control panel.

7. The apparatus for stacking and unstacking nestable containers recited in claim 6, wherein said manual control panel comprises:

a) a ready blue light;
b) a hamper selector switch;
c) a lift switch;
d) a lower switch;
e) an in switch;
f) an out switch; and
g) a power on light.

8. The apparatus for stacking and unstacking nestable containers recited in claim 7, wherein said control panel is mounted on the front of a side safety guard.

9. The apparatus for stacking and unstacking nestable containers recited in claim 8, wherein the stacking procedure includes:

a) setting the hamper selector switch to the appropriate type of container to be stacked;
b) inserting said container between said container guides;
c) pressing said in switch to draw said lifting elements together to grasp said container;
d) pressing said up switch to raise said lifting assembly and said container;
e) inserting another container therein;
f) pressing said down switch to lower said lifting assembly thereby placing the first container into the second; and
g) repeating the process as necessary.

10. The apparatus for stacking and unstacking nestable containers recited in claim 9, wherein said process is reversed during the unstacking procedure.

11. The apparatus for stacking and unstacking nestable containers recited in claim 10, further including a lockout device that will disconnect all electrical power to the unit when placed in the off position.

12. The apparatus for stacking and unstacking nestable containers recited in claim 11, further including caster wheels disposed underneath to provide mobility to easily transport said apparatus from one location to another.

13. The apparatus for stacking and unstacking nestable containers recited in claim 12, further including floor locks to prevent said apparatus from shifting during operation.

14. The apparatus for stacking and unstacking nestable containers recited in claim 13, wherein said motor further includes a limit switch and a support bushing assembly.

15. The apparatus for stacking and unstacking nestable containers recited in claim 14, wherein said pump and motor operate on 220'240 volts AC power.

16. The apparatus for stacking and unstacking nestable containers recited in claim 15, wherein said apparatus has a maximum lift capacity of 1200 lbs.

\* \* \* \* \*